United States Patent [19]

Lane

[11] Patent Number: 5,722,888
[45] Date of Patent: Mar. 3, 1998

[54] ROLLER ASSEMBLY FOR AGRICULTURAL MACHINES

[76] Inventor: John L. Lane, P.O. Box 488, Greeley, Colo. 80632

[21] Appl. No.: 662,162

[22] Filed: Jun. 12, 1996

[51] Int. Cl.$^6$ .......................... A01D 75/00; B65G 13/00
[52] U.S. Cl. .......................... 460/114; 460/144; 193/37; 198/780
[58] Field of Search .......................... 460/114, 119, 460/144, 904; 193/37, 35 R; 198/780

[56] References Cited

U.S. PATENT DOCUMENTS

| 5,022,132 | 6/1991 | Valster et al. ...................... 193/37 X |
| 5,361,884 | 11/1994 | Yonezawa ............................ 193/37 |
| 5,454,460 | 10/1995 | Lane ..................................... 193/37 |

*Primary Examiner*—Terry Lee Melius
*Attorney, Agent, or Firm*—Baker, Maxham, Jester & Meador

[57] ABSTRACT

A roller assembly is disclosed for an agricultural conveyor apparatus including an endless conveyor supported on one or more roller assemblies mounted on a support frame. The roller assembly includes a conveyor support roller having a central bore formed therein and bearing supports formed on the roller for receiving a clamping force imparted by a pair of opposing bearings that support the roller. An axle is mountable to a frame portion of an agricultural conveyor apparatus and extends through the central bore of the roller. A clamping bearing assembly is provided for rotably securing the conveyor support roller to the axle. The bearing assembly includes a pair of bearings having radial inner portions secured for axial adjustment on the axle and radial outer portions configured to apply a clamping force on the bearing support portions of the roller.

19 Claims, 2 Drawing Sheets

ROLLER ASSEMBLY FOR AGRICULTURAL MACHINES

BACKGROUND OF THE INVENTION

1. Field of the Invention

The present invention is directed generally to agricultural machines. More specifically, the invention is directed to harvesting and crop processing equipment employing roller driven belt conveyors for transporting fruit and vegetable products to facilitate their preparation for market.

2. Description of Related Art

Conveyors are commonly used during the harvesting and processing of agricultural products to perform various tasks required to prepare such products for market. Sorters, for example, are devices that use conveyors to transport crops harvested from the field past scanning devices that measure the produce and allow it to be selectively removed from the conveyor for grouping by size and/or weight. In some conveyors, a series of transverse pivoting fingers are mounted on an endless belt for carrying individual produce units. The fingers selectively pivot in order to flip the produce into selected receiving areas adjacent the conveyor based on information provided by the scanning devices.

Harvesters use conveyors to separate the produce from dirt, vines and other materials that are dug up with the crop as it is harvested from the field. Such conveyors typically employ an endless belt made from a plurality of transverse rods or bars whose ends are interconnected by a pair of endless bands of material, one on each end of the rods or bars. The rods or bars are spaced from each other on the endless bands in order to carry the produce while allowing unwanted material to fall through the conveyor.

The prior art conveyors use a plurality of rollers to support and carry the belt portion thereof. The rollers are usually mounted to a frame in parallel rows. The rollers are attached to the frame via horizontal mounting shafts and are spaced from the frame a uniform distance to engage the side edge regions of the belt. The edges of the belt pass over and under the rollers to provide a long planar path for the produce to follow as the belt is driven by an appropriate power source. Often, the rollers are provided with radial flanges that prevent the edges of the belt from rubbing against the frame, which could lead to excessive wear and possible misalignment.

It is typical in agricultural harvesting and processing equipment that the rollers of a conveyor wear out long before the belt. The rollers usually include an outer cylindrical wheel portion formed on a hub containing bearings that reduce frictional losses and minimize wear and tear on the power source. The wheel portion of the wheel is typically made from plastic or rubber and wears out after prolonged use. The bearings can also fail in the harsh environments in which agricultural conveyors are used. In harvesting, for example, the rollers may be covered in dirt for extended periods of time during operation. Although the bearings are usually sealed, they will ultimately succumb to the dirt and grit to which they are exposed.

In prior art designs, the rollers of agricultural conveyors are generally of unified construction. As a consequence, the entire roller must be replaced when any component thereof has failed. In my related U.S. Pat. No. 5,454,460 (hereinafter the "'460 patent"), a non-unitary roller design is disclosed in which separately replaceable bearing and hub elements are utilized as modular components. If any of these components, or subcomponents thereof, needs replacement, it is a relatively simple task to do so. Moreover, rollers of different size and shape can be built for different agricultural environments using bearings and hub components from other rollers.

Although it is a vast improvement over prior art unitary designs, I have determined that the design disclosed in my '460 patent suffers from a slight disadvantage insofar as it requires a two-part hub held together with fasteners that must be removed in order to replace the bearings. That is because the radial outer portions of the bearings are secured in a hub cavity that is formed by joining the two hub components together. This renders the rollers more expensive to manufacture and more time consuming to rebuild than they otherwise might be. However, the design of my '460 patent possesses superior bearing sealing characteristics.

In view of the foregoing, there remains a need in the art for a roller assembly for agricultural machines that addresses the above-referenced disadvantage of my prior design. What is required is a roller assembly that is completely modular in nature, inexpensive to manufacture, and which can be rebuilt with a minimal expenditure of time and effort. Importantly, these design goals should be achieved without sacrificing the quality of the bearing seals.

SUMMARY OF THE INVENTION

In accordance with the foregoing objectives, a roller assembly is provided for an agricultural conveyor apparatus including an endless conveyor supported on one or more roller assemblies mounted on a support frame. The roller assembly includes a conveyor support roller having a central bore formed therein and bearing supports formed on the roller for receiving a clamping force imparted by a pair of opposing bearings that support the roller. An axle is mountable to a frame portion of an agricultural conveyor apparatus and extends through the central bore of the roller. A bearing assembly is provided for rotatably securing the conveyor support roller to the axle. The bearing assembly includes a pair of bearings having radial inner portions secured for axial adjustment on the axle and radial outer portions secured to apply a clamping force on the bearing supports formed on the roller.

BRIEF DESCRIPTION OF THE DRAWINGS

The objects, advantages and features of the present invention will be more clearly understood by reference to the following detailed disclosure and the accompanying drawing in which.

DETAILED DESCRIPTION OF THE PREFERRED EMBODIMENTS

Figure 1:
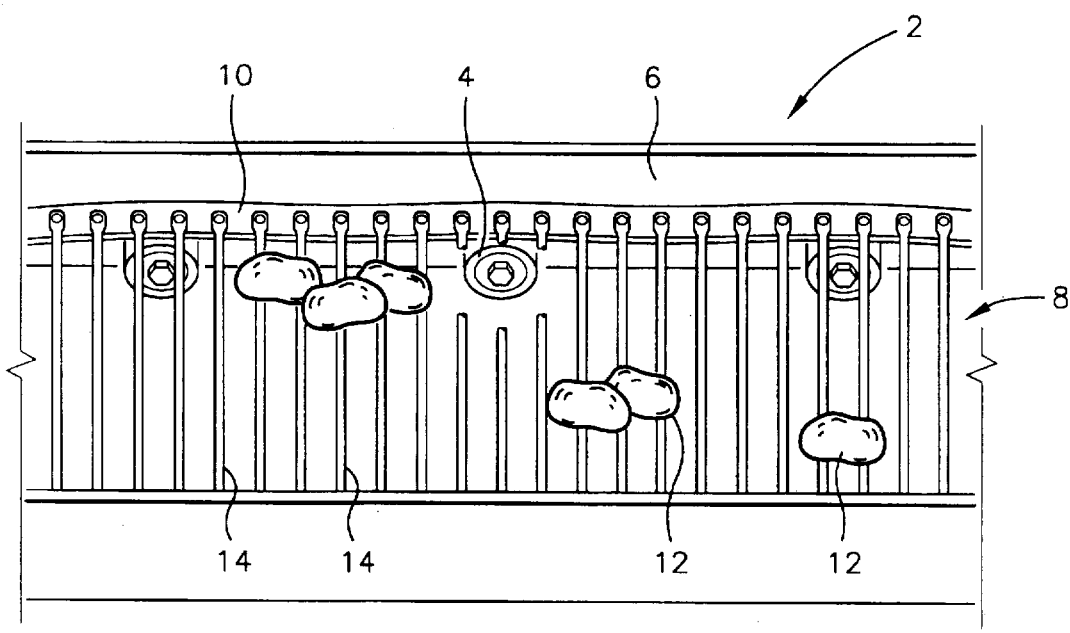
FIG. 1 is an oblique perspective view of a portion of an agricultural harvesting machine showing rollers of the present invention secured thereto.

Referring now to FIG. 1, a portion of an agricultural machine 2 is shown with roller assemblies 4 attached to a machine frame member 6. The machine 2 has an endless conveyor belt or chain 8 formed from a pair of continuous bands of material 10 (only one of which is shown in FIG. 1), made from canvass or other suitable materials, that pass over and under the roller assemblies 4 as the conveyor travels through the machine. Agricultural crops, such as potatoes 12, are supported by a plurality of spaced transverse bars or rods 14 having end portions mounted on the continuous bands 10. As the conveyor belt or chain 8 is driven over the rollers 4 by an external power source (not shown), vines, stones and trash brought in with the produce from the field fall between the bars or rods 14. While the machine of FIG. 1 shows the use of the continuous bands 10 to which the bars or rods 14 are secured, many such conveyors are composed of bars or rods only, with the ends curled and interconnected.

Figure 2:
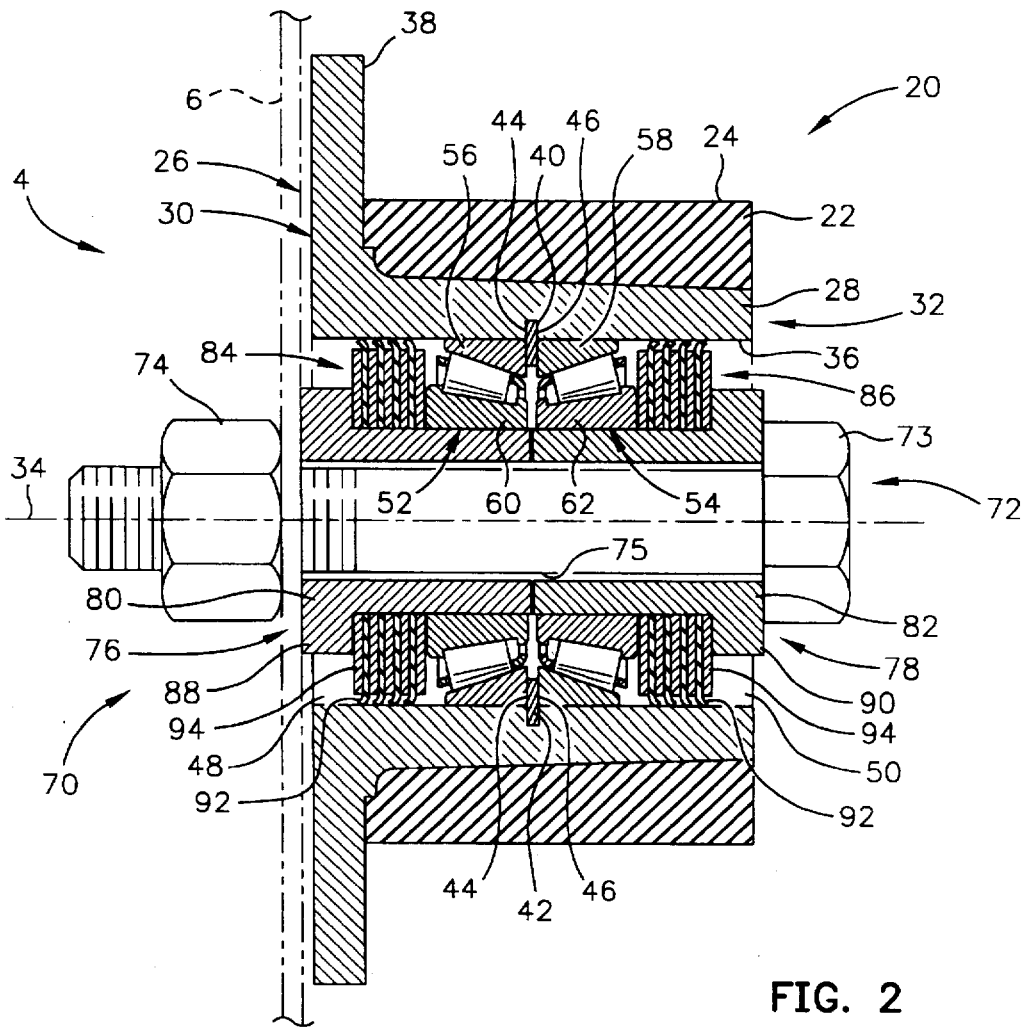
FIG. 2 is a sectional view of a preferred embodiment of the present invention.
Figure 3:
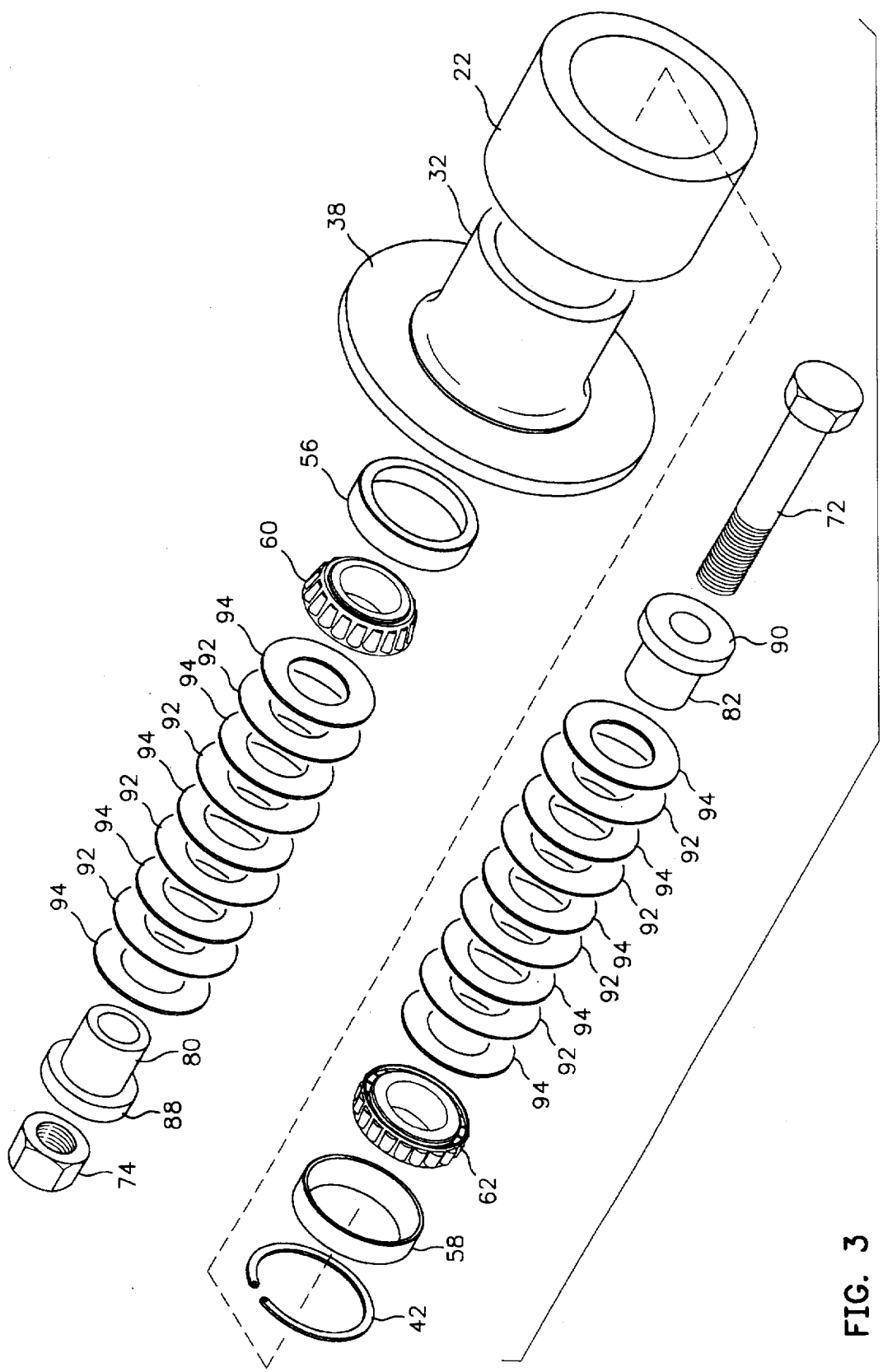
FIG. 3 is an exploded perspective view of the preferred embodiment shown in FIG. 2.

Referring now to FIGS. 2 and 3, a preferred embodiment of the invention is shown in which the assembly 4 is formed from a plurality of modular components which allows them to be readily removed from the frame member 6 as a unit, or as individual components. The roller assembly 4 includes a sub-assembly 20 which may be referred to either as a conveyor support roller, or simply a roller. The roller 20 includes an outer tire 22 made from rubber or the like that provides an exterior surface portion of 24 of the roller 20. The roller 20 also includes an interior unitary hub member 26 made from steel or the like that provides an interior hub portion 28 of the roller 20. The roller 20 is generally cylindrical in shape and has a pair of sides 30 and 32 and a central axis of rotation 34 extending between the sides. The roller 20, and specifically the hub portion 28 thereof, is formed with a central bore 36 that extends in the direction of, and is centered about the axis of rotation 34. On one side of the roller 20, the roller hub portion 28 is formed with an enlarged flange 38 extending radially outwardly to protect the endless belt 8 from chafing against the conveyor machine frame member 6.

The central bore 36 of the roller hub portion 28 is generally cylindrical. Centrally disposed within the cylindrical bore 36 is an annular slot or groove 40, which is preferably machined into the unitary hub member 26. The annular groove 40 receives an annular split ring spacer member 42 therein. The split ring spacer 42 provides a pair of opposing bearing support surfaces 44 and 46 in the central bore 36. The bearing support surfaces 44 and 46 define the rear portions of a pair of cavities 48 and 50 formed by the central bore 36, which itself may be thought of as defining recesses in the sides 30 and 32 of the roller 20. Each cavity 48 and 50 is centered on the axis of rotation 34. Because the split ring spacer 42 is annular, the central bore 36 extends between the cavities 48 and 50 along the axis of rotation 34, thereby interconnecting the two cavities.

Located within the central bore 36 is a bearing sub-assembly provided by a pair of opposing tapered roller bearing sets 52 and 54. The bearings 52 and 54 each include outer radial portions 56 and 58 formed by cups (races). They also include radial inner portions 60 and 62 formed by rollers (cones). In the preferred embodiment, the bearings 52 and 54 are axial thrust bearings. In accordance with the conventional design of such bearings, the radial inner portions 60 and 62 are seated in the radial outer portions 56 and 58 by applying an axial compressive force on the radial inner portions which imparts both an axial thrust load and a radial load on the radial outer portions due to the tapered shape of the rollers. The outer radial portions 56 and 58 of the bearings 52 and 54 are positioned to engage the bearing support surfaces 44 and 46, respectively. They are also positioned to engage the sides of the axial bore 36, which also forms part of the bearing support surfaces.

The radial inner portions 60 and 62 of the bearings 52 and 54 are mounted on an axle assembly 70, which is a sub-assembly of the roller 20. The axle assembly 70 is mountable to the conveyor frame member 6 via an arrangement that includes a bolt 72 having a bolt head 73, and a nut 74 mounted on a stem portion of the bolt 72 which provides an axle or shaft 75. The bolt 72 extends through the central bore 36 of the roller 20 along the axis of rotation 34, and through a hole (not shown) in the frame member 6. The bolt 72 is secured to the frame member 6 via the nut 74. The axle assembly 70 also includes first and second bearing retainers 76 and 78 mounted on the axle 75. The bearing retainers 76 and 78 engage the radial inner portions 60 and 62 of the bearings 52 and 54 and impart an axial compressive force that urges the bearing inner portions 60 and 62 together. In this regard, the bolt head 73 and the nut 74 provide a pair of axially adjustable clamping members secured on the axle 75 adjacent to the bearing retainers. Alternatively, the axially adjustable clamping members could be provided by a pair of nuts on the axle 75, or by the bearing retainers themselves, in which case the bearing retainers, or components thereof, would be internally threaded for adjustable engagement on the axle 75. The axial compressive force provided by the clamping members must be sufficient to secure the bearing inner portions 60 and 62 to the axle 75 and the outer bearing portions 56 and 58 to the bearing support surfaces 44 and 46 of the roller 20.

The bearing retainers 76 and 78 are preferably formed from a pair of flanged bushings 80 and 82, together with a pair of seal sub-assemblies 84 and 86. The seal sub-assemblies 84 and 86 are disposed between the flanges 88 and 90 of the bushings 80 and 82, and the bearing radial inner portions 60 and 62. The seal sub-assemblies 84 and 86 each include a sequence of resilient seal members and rigid spacer members. In the preferred embodiment, there are four seal members made from resilient, oil and chemical resistant rubber rings 92. The rubber seal rings 92 have exact dimensions and include a calculated hardness and an outside diameter that is somewhat larger than the inside diameter of the central bore 36. The rubber seal rings 92 are placed on each spacer bushing 76 and 78, and are separated by steel rings 94, which have an exact thickness, the same inside diameter, but a smaller outside diameter than the rubber seal rings 92. The spacer bushings 76 and 78 are dimensioned so as to allow the inner bearing portions 60 and 62 to be placed on the bushings after all the rubber and steel rings 92 and 94 have been placed. This allows an exact length of the spacer bushings 80 and 82 to extend beyond the axial inner edge of each bearing inner portion 60 and 62. As both of the spacer bushings 76 and 78 are installed from opposite ends into the axial bore 36, a calculated portion of the outer diameter of each rubber seal ring 92 will fold outwardly and the inner ends of each spacer bushing 80 and 82 will come together and eventually touch as the bolt 72 and nut 74 are tightened on the frame member 6. The axial length of each bushing 80 and 82 is preferably selected so that an optimum compressive preload is placed on the bearings 52 and 54 when the bushings 80 and 82 are axially compressed until their respective end portions meet at the axial mid-point of the central bore 36. In addition to allowing the inner bearing portions 60 and 62 to seat on the respective outer bearing portions 56 and 58, this also compresses the eight rubber seal rings 92 to a calculated compression which prevents them from rotating on the spacer bushings 76 and 78. Thus, by carefully controlling the axial length of the spacer bushings 76 and 78, the bearings 52 and 54 will have an appropriate preload when the spacer bushings 76 and 78 engage one another. Moreover, the rubber seal rings 92 will be secured in position to seal the bearings from environmental contamination while allowing for absorption of tolerance accumulation that otherwise could prevent the roller 20 from functioning. The four rubber seal rings 92 folding outwardly, in combination with the calculated outer diameter of the steel rings 94 mounted on each of the spacer bushings 76 and 78, accommodates retention of the bearings 52 and 54, once installed. This permits the elimination of other devices that would otherwise be required to retain each bearing in a secure position disposed between the roller 20 and the axle assembly 70. The rubber seal rings 92 have a calculated dimension on the outer diameter that allows for predictable wear due to abrasion and other environmental considerations that cause the rings 92 to slowly extend to a more lineal configuration away from the initial folded-back position.

Once bolted to the frame member 6, the roller assembly 4 will, by its own nature, remain assembled with exact bearing preloads. This allows for extremely easy removal of each roller assembly and the sub-assemblies thereof for quick and easy repair. This feature is of great value as each roller assembly 4 could be very expensive to replace as a unit. Moreover, down-time during harvesting is costly. The spacer bushings 76 and 78 also accommodate mounting the roller assembly 4 to the conveyor machine at an exact distance from the frame member 6, and allow for easy sizing of different bolt diameters. The foregoing design also allows for a two-part sub-assembly rebuild kit. One component of this kit would be provided by the roller 20. The other component would be provided by a combination of the bearings 52 and 54, together with the bearing retainers 76 and 78 and the clamping members of the axle assembly 70, which together may be thought of as providing a clamping bearing system that clamps the roller and secures it for rotation relative to the axle 75. This kit can be used to replace all bearings and seals in a matter of seconds once the roller assembly is off the frame, with no tools other than the repair person's hands.

Accordingly, an improved roller assembly for agricultural machines has been described. While various embodiments have been disclosed, it should be apparent that many variations and alternative embodiments would be apparent to those skilled in the art in view of the teachings herein. It is understood, therefore, that the invention is not to be in any way limited except in accordance with the spirit of the appended claims and their equivalents.

I claim:

1. A roller assembly for an agricultural conveyor apparatus including an endless conveyor supported on one or more roller assemblies mounted on a support frame, said roller assembly comprising:

a roller including an exterior surface portion adapted to support a conveyor element and an interior hub portion having a central bore defining an axis of rotation of said roller;

a pair of bearing support surfaces formed in said central bore;

a pair of opposing tapered bearings positioned in said central bore, said bearings having a radial outer portion engaging said bearing support surfaces and a radial inner portion; and an axle assembly mountable to a frame portion of an agricultural conveyor apparatus and extending through said central bore and said bearings, said axle assembly including first and second bearing retainers engaging said radial bearing inner portions and imparting an axial compressive force urging said radial bearing inner portions together, said axial compressive force being sufficient to secure said radial bearing inner portions to said axle and said radial bearing outer portions to said roller.

2. The roller assembly of claim 1 wherein said central bore is generally cylindrical.

3. The roller assembly of claim 1 wherein said bearing support surfaces are provided at least in part by a flange extending radially into said central bore.

4. The roller assembly of claim 1 wherein said exterior surface portion and said interior hub portion of said roller are formed from separate components.

5. The roller assembly of claim 1 wherein said bearings are tapered roller bearings.

6. The roller assembly of claim 5 wherein said bearings have an outer cup which engages said bearing support surfaces and an inner cone which engages said bearing retainers.

7. The roller assembly of claim 1 wherein said bearing retainers include a pair of seals positioned axially outwardly from said bearings.

8. The roller assembly of claim 7 wherein said seals include a plurality of individual resilient seal and spacer elements mounted on said axle assembly, said seal elements extending radially outwardly across said central bore to deformably engage said interior hub portion.

9. The roller assembly of claim 1 wherein said axle assembly includes a shaft extending in said bore along said axis of rotation, wherein said bearing retainers include a pair of bushings mounted on said shaft and supporting said radial bearing inner portions, and wherein said axle assembly further includes a pair of axially adjustable clamping members secured on said shaft to retain said flanged bushings in position.

10. The roller assembly of claim 9 wherein said bearing retainers further include a pair of seals mounted on said spacer bushings adjacent to said radial bearing inner portions.

11. A roller assembly having readily replaceable modular components for use within an agricultural conveyor apparatus including an endless conveyor supported on one or more roller assemblies mounted on a support frame, said roller assembly comprising:

a roller sub-assembly for supporting a conveyor element, said roller being generally cylindrical in shape and having a pair of sides and a central axis of rotation extending between said sides, said roller sub-assembly further comprising:

a pair of cavities formed by recesses in said roller sub-assembly sides, each cavity being centered on said central axis of rotation and having a rearward portion facing at least partially toward a corresponding one of said roller sides to provide a bearing support surface; and a central bore extending between said cavities along said central axis of rotation;

a bearing sub-assembly adapted to mount in said roller sub-assembly cavities, said bearing sub-assembly comprising a pair of bearings having a radial outer portion which engages said bearing support surfaces and a radial inner portion; and an axle sub-assembly mountable on a frame portion of an agricultural conveyor and which extends through said central bore of said roller sub-assembly and said bearings, said axle sub-assembly comprising:

an axle; and a pair of bearing retainers mounted on said axle and imparting an axial compressive force urging said radial bearing inner portions together and said bearing outer portions against said bearing support surfaces, thereby rotatably securing said roller subassembly on said axle sub-assembly via said bearings.

12. The roller assembly of claim 11 wherein said cavities are generally cylindrical.

13. The roller assembly of claim 11 wherein said bearing support surfaces are provided at least in part by at least one radially inwardly extending flange in said roller sub-assembly.

14. The roller assembly of claim 11 wherein said bearings are tapered bearings.

15. The roller assembly of claim 14 wherein said bearings have an outer cup which engages said bearing support surfaces and an inner cone which engages said bearing retainers.

16. The roller assembly of claim 11 wherein said bearing retainers includes a pair of seals positioned axially outwardly from said bearings.

17. The roller assembly of claim 16 wherein said seals include a plurality of individual resilient seal and spacer elements mounted on said axle sub-assembly, said seal elements extending radially outwardly across said cavities.

18. The roller assembly of claim 11 wherein said bearing retainers include a pair of flanged spacer bushings supporting said bearings, and a pair of axially adjustable clamping members secured on said axle adjacent to said spacer bushings.

19. The roller assembly of claim 18 wherein said bearing retainers further include a pair of seals mounted on said spacer bushings adjacent to said bearings.

* * * * *